United States Patent
Johnson et al.

[11] Patent Number: 5,971,661
[45] Date of Patent: Oct. 26, 1999

[54] WATER CONTAINMENT DEVICE AND LEVEE FOR IMPEDING A FLOW OF WATER

[76] Inventors: Harold Wayne Johnson, 3518 D. Ginn Dr., Knoxville, Tenn. 37920; Don Wittenberg, 7829 Ramsgate Dr., Knoxville, Tenn. 37919; Charles T. Shankles, 8716 Millertown Pike, Knoxville, Tenn. 37924

[21] Appl. No.: 08/902,860

[22] Filed: Jul. 30, 1997

[51] Int. Cl.⁶ .................................................. E02B 7/20
[52] U.S. Cl. ......................................... 405/114; 405/107
[58] Field of Search .................................. 405/107, 110, 405/111, 115, 116, 114

[56] References Cited

U.S. PATENT DOCUMENTS

| | | | |
|---|---|---|---|
| 3,213,628 | 10/1965 | Serota | 405/111 |
| 3,680,319 | 8/1972 | Draper et al. | 405/116 |
| 4,330,224 | 5/1982 | Muramatsu et al. | 405/115 |
| 4,692,060 | 9/1987 | Jackson, III | 405/115 |
| 4,784,520 | 11/1988 | Stevens | 405/107 |
| 4,921,373 | 5/1990 | Coffey | 405/115 |
| 4,973,947 | 11/1990 | Tax | 340/618 |
| 5,040,919 | 8/1991 | Hendrix | 405/415 |
| 5,125,767 | 6/1992 | Dooleage | 405/115 |
| 5,176,468 | 1/1993 | Poole | 405/111 |
| 5,236,281 | 8/1993 | Middleton | 405/114 |
| 5,283,569 | 2/1994 | Nelson | 340/623 |
| 5,439,316 | 8/1995 | Richardson | 405/114 |
| 5,470,177 | 11/1995 | Hughes | 405/115 |
| 5,511,902 | 4/1996 | Center | 405/16 |
| 5,552,774 | 9/1996 | Gridley | 340/623 |
| 5,632,573 | 5/1997 | Baker | 405/111 |

*Primary Examiner*—David Bagnell
*Assistant Examiner*—Frederick Lagman
*Attorney, Agent, or Firm*—Luedeka Neely & Graham PC

[57] ABSTRACT

A water containment device and levee for impeding a flow of water. The water containment device includes a body portion having a first end, a second end, a base, and a first side and a second side attached to the base. At least one valve is disposed in the first end for introducing a water into the body portion. A flap is also provided that is integrally formed with the body portion and extends outward therefrom. The flap for receiving another water containment device thereon and impeding movement of the water containment device. The flap is also used to divert the flow of water away from the levee should the level of the water exceed the levee.

29 Claims, 4 Drawing Sheets

WATER CONTAINMENT DEVICE AND LEVEE FOR IMPEDING A FLOW OF WATER

FIELD OF THE INVENTION

In general, the present invention relates to barriers and, in particular, the present invention relates to a water containment device and levee for impeding a flow of water.

BACKGROUND

Problems have existed for many years relating to an effective use of barriers for impeding a flow of water, such as during a flood. Typically, sandbags have been placed end to end to form a horizontal barrier and stacked one upon another to form a levee to divert or otherwise impede the flow of water into certain low-lying areas. Sandbags are difficult to use for this purpose for a number of reasons. First, the use of sandbags to form water barriers requires transportation of a large quantity of sand for filling the bags. Second, a great number of people are needed to fill and stack the sandbags. Third, building barriers with sandbags is very time consuming. Fourth, after the flood waters have subsided, the sandbags are often contaminated with substances such as oil, fuel, and other toxic chemicals that may have seeped into the sandbags. As a result, disposal of the sandbags must be achieved in accordance with applicable environmental laws and standards.

Various attempts have been made in the prior art to impede the flow of water, with objects other than sandbags. For example, devices currently exist that can be filled with water. These devices have many disadvantages such as being unstackable and thereby failing to impede the flow of water if its level increases above a horizontal row of the water containment devices. Because the water containment devices are unstackable, the devices also do not contain means for securing a plurality of them together when stacked. The devices are difficult to construct and fill with water, and also do not contain means for diverting the flow of water away from the water containment devices if the flow of water should overflow the devices. In addition, the water containment devices do not include means for quickly filling two of the water containment devices, which are in axial alignment, with water.

SUMMARY OF THE INVENTION

The present invention eliminates the above difficulties and disadvantages of the prior art by providing a water containment device and levee for impeding a flow of water. The water containment device preferably includes a body portion that has a first end, a second end, a base, and a first side and a second side attached to the base. The water containment device further includes at least one valve disposed in the first end for introducing water into the body portion. A flap is integrally formed with the body portion and extends outward therefrom. One use for the flap is for receiving another water containment device thereon and impeding movement of the body portion. The body portion is also collapsible for storage via the base being deformable into an interior chamber of the body portion between the first and second sides. Also preferably, the body portion is elongated and triangular in shape. In addition, the first and second sidewalls each project at 60° angles from the base, thereby forming an isosceles triangle for the body portion. The water containment device further includes a first structural support member that is attached to the first side on the interior chamber of the body portion for impeding the first side from collapsing under weight of another water containment device stacked thereon. Similarly, a second structural support member is attached to the second side on the interior chamber of the body portion for impeding the second side from collapsing under weight of another water containment device stacked thereon.

Preferably, the at least one valve is a fill valve that protrudes outward from the first end. The first end also preferably includes a bleed valve disposed therein and protruding outward therefrom. The bleed valve is for releasing air contained within the body portion while the water is being introduced into the body portion. The water containment device further includes a first flange that is disposed around, and attached to, the first end. The first flange protrudes outward from the first end a distance greater than the fill and bleed valves. A second flange is disposed around and attached to the second end. The fill and bleed valves, the first and second flanges, and the flap are formed from a non-porous, liquid repelling material. Preferably, the liquid repelling material is comprised of Poly-Vinyl Chloride ("PVC").

In another embodiment of the present invention, a levee is provided for impeding the flow of water. The levee includes at least a first level that has a first water containment device including: a body portion that has a first end, a second end, a base, and a first and second side attached to the base. A flap is integrally formed with the body portion and extends outward therefrom. The flap is for receiving another water containment device thereon and impeding movement of the body portion of the first water containment device. The levee further includes a second water containment device that has a body portion having a first end, a second end, a base, and a first and second side attached to the base. A flap is also provided on the second water containment device and preferably integrally formed with the body portion of the second water containment device and that extends outward therefrom. The flap of the second water containment device is for receiving another water containment device thereon and for impeding movement of the body portion of the second water containment device. The levee also includes a third water containment device that is disposed between the first and second water containment devices such that a first side of the third water containment device is abutting a first side of the second water containment device and a second side of the third water containment device is abutting the second side of the first water containment device. Thereby, the base of the second water containment device is at least partially disposed on the flap of the first water containment device and the flap of the third water containment device is overlaying at least part of the first side of the first water containment device. The levee also includes a second level that has a fourth water containment device that includes a body portion having a first end, a second end, a base, and first and second sides attached to the base. The base of the first water containment device is disposed on the base of the third water containment device. Fill and bleed valves are disposed in the first end of the first, second, third, and fourth water containment devices and protruding outward therefrom. The bleed valve is for releasing air contained within the body portion while the water is being introduced into the body portion via the fill valve.

Preferably, the flap of a third water containment device overlays at least part of the first side of the first water containment device and is for diverting the flow of water if the water rises to a level greater than the levee such that the water is diverted away from a seam created between the first side of the third water containment device and the second side of the first water containment device. The body portion of the first, second, third, and fourth water containment devices is collapsible for storage via the base of the first, second, third, and fourth water containment devices deforming into an interior chamber of the body portion between the first and second sides of the first, second, third, and fourth water containment devices. The levee further includes a first structural support member attached to the first side and a second structural support member attached to the second side on the interior chamber of the body portion of the first, second, third, and fourth water containment devices for impeding the first and second sides of the body portion from collapsing under weight from another water containment device stacked thereon. The levee also includes a first flange disposed around and attached to the first end of the first, second, third, and fourth water containment devices. The first flange protrudes outward from the first end a distance greater than the fill and bleed valves.

In a further embodiment of the levee of the present invention, a fifth water containment device is included that has a first end, a fill and bleed valve disposed in the first end, and a first flange. The fifth water containment device is in axial alignment with the first water containment device such that the first flange of the first water containment device abuts the first flange of the fifth water containment device such that the body portions of the first and fifth water containment devices can be filled with the water at a singular position point. The body portion, fill and bleed valves, first flange, and the flap of the first, second, third, fourth, and fifth water containment devices are formed from a non-porous, liquid repelling material, which is preferably comprised of PVC.

Other objects, features and advantages of the present invention will become apparent by reference to the following detailed description when considered in conjunction with the accompanying drawings.

DESCRIPTION OF THE PREFERRED EMBODIMENT(S)

Figure 1A:
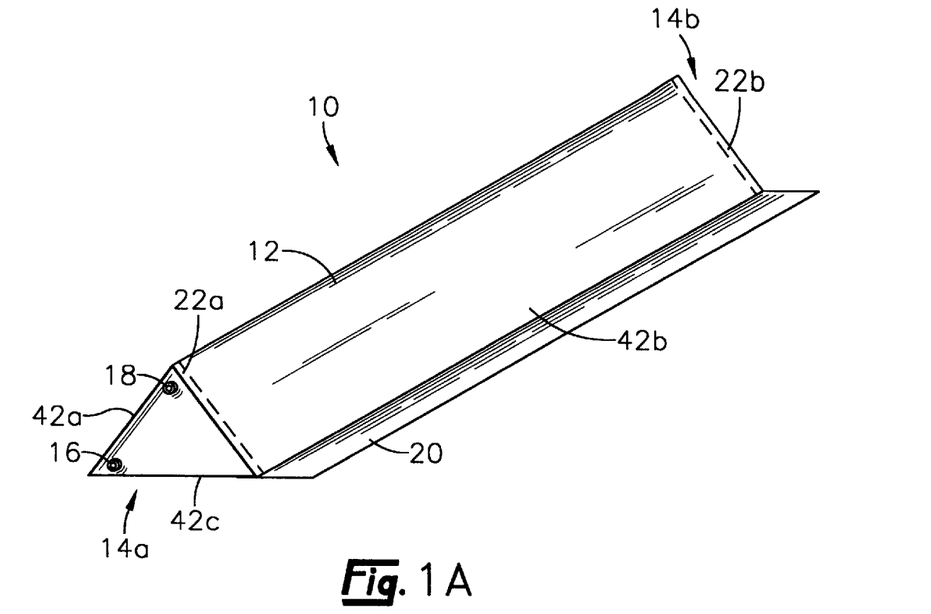
FIG. 1A is a perspective view of an water containment device for impeding a flow in accordance with water of the present invention.

Commencing with FIG. 1A, a water containment device 10 is shown for impeding a flow of water. The water containment device 10 includes a body portion 12 that is elongated, and is preferably triangular in shape and forms an isosceles triangle. The body portion 12 is substantially hollow and includes an interior chamber 25 (FIG. 1B) for receiving water therein that adds weight and stability to the water containment device 10. The water containment device 10 includes a first end 14a and a second end 14b, which are attached to the body portion 12, and axially opposed. The water containment device 10 further includes a base 42c to which is attached a first side 42a and a second side 42b. Preferably, the first side 42a and second side 42b each project at a 60° angle from the base 42c thereby forming the isosceles triangle.

Figure 4:
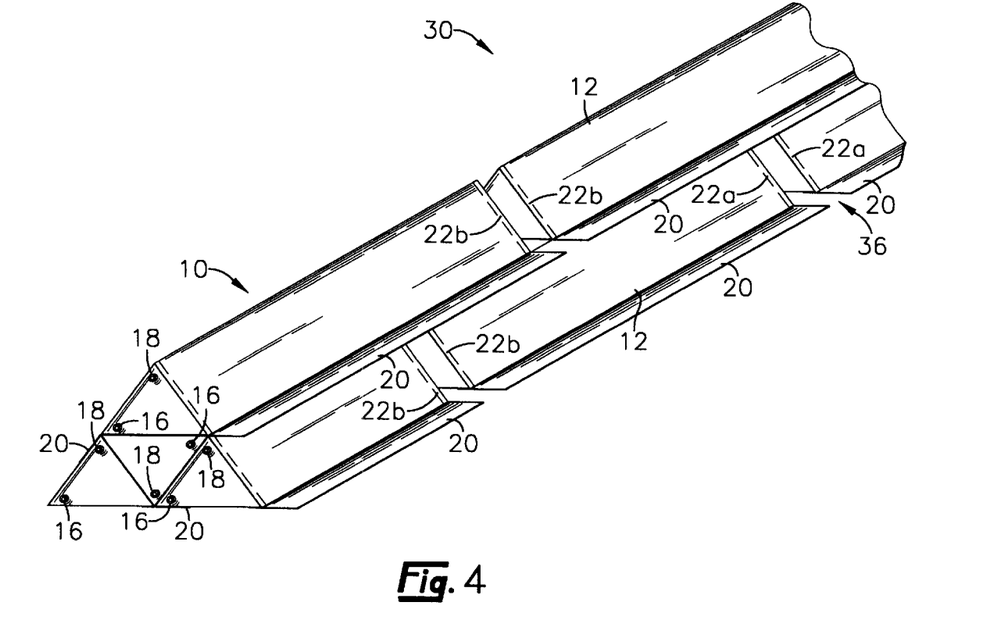
FIG. 4 is a perspective view of a levee in accordance with the present invention showing dual fill and purge position points along the levee.
Figure 5:
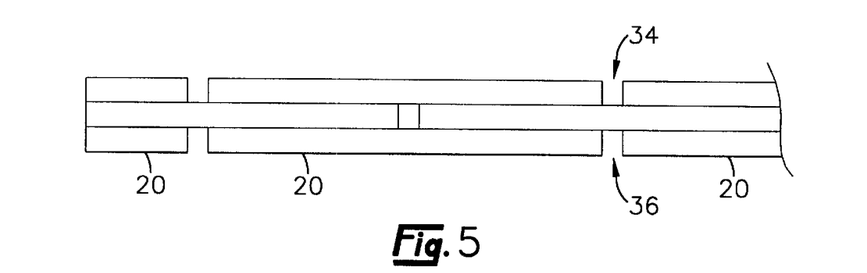
FIG. 5 is a plan view of a levee in accordance with the present invention.

At least one valve is disposed in the first end 14a for introducing the water into the body portion 12. In preference, however, two valves are disposed in the first end 14a, including a fill valve 16 and a bleed valve 18. The fill and bleed valves 18 and 16, can be flush with the first end 14a but preferably protrude outward from the first end 14a for easy access. The bleed valve 18 is for releasing air contained within the interior chamber 25 while the water is being introduced therein via the fill valve 16. The water containment device 10 further includes a first flange 22a that is disposed adjacent and attached to the first end 14a. Preferably, the first flange 22a protrudes outward from the first end 14a a distance greater than the fill and bleed valves 18 and 16. Similarly, a second flange 22b is disposed adjacent and attached to the second end 14b of the body portion 12. Preferably, the first and second flanges 22a and 22b are integrally formed with the body portion 12. As shown in FIGS. 4 and 5, by placing two water containment devices in axial alignment such that the first flanges 22a of each of the water containment devices 10 abut, dual fill and purge position points 34 and 36 are created such that an operator may simultaneously fill and purge two of the water containment devices 10 from one position, as further described below.

Figure 1B:
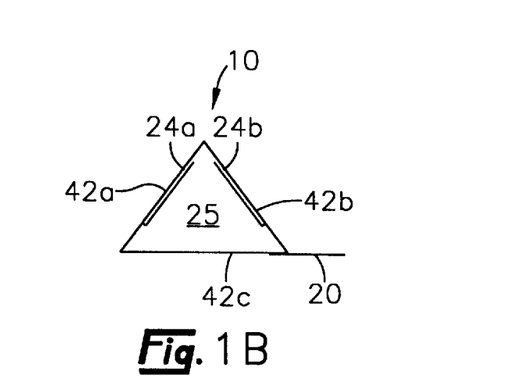
FIG. 1B is a cross-sectional view of the water containment device of FIG. 1.

Referring now to FIG. 1B, the water containment device 10 further includes a first structural support member 24a attached to the first side 42a on the interior chamber of the body portion 12 for maintaining form of the first side 42a and for impeding the first side 42a of the body portion 12 from collapsing under weight of another water containment device stacked thereon. The water containment device 10 also includes a second structural support member 24b that is attached to the second side 42b on the interior chamber of the body portion 12 for maintaining form of the second side 42b and for impeding the second side 42b from collapsing under weight stacked thereon. The first and second structural support members 24a and 24b may also serve as baffles to quell movement of the water within the interior chamber of the body portion 12.

Figure 1C:
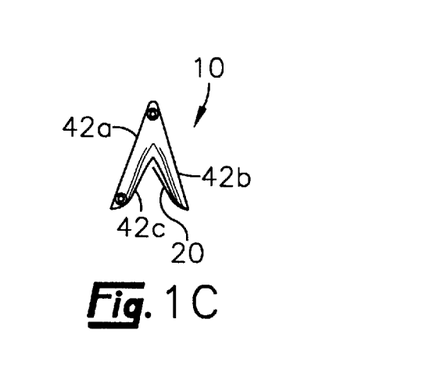
FIG. 1C is an end view of the water containment device of FIG. 1 with the apparatus in a folded position.

As shown in FIG. 1C, the body portion 12 is collapsible for storage. To collapse the body portion 12, the base 42c is deformed into the interior chamber 25 between the first and second sides 42a and 42b. The water containment device 10 may then be easily stacked for transportation and storage.

Preferably, the body portion 12, the fill and bleed valves 18 and 16, the first and second ends 14a and 14b, the flap 20, and the first and second flanges 22a and 22b, are formed from a non-porous, liquid repelling material such that any toxins or environmentally unsafe contaminants contained within the flow of water do not penetrate and are not absorbed by the water containment device 10. Therefore, the water containment device 10 may be reused with little or no decontamination required. Also preferably, the non-porous, liquid repelling material is comprised of Poly-Vinyl Chloride ("PVC").

Figure 2:
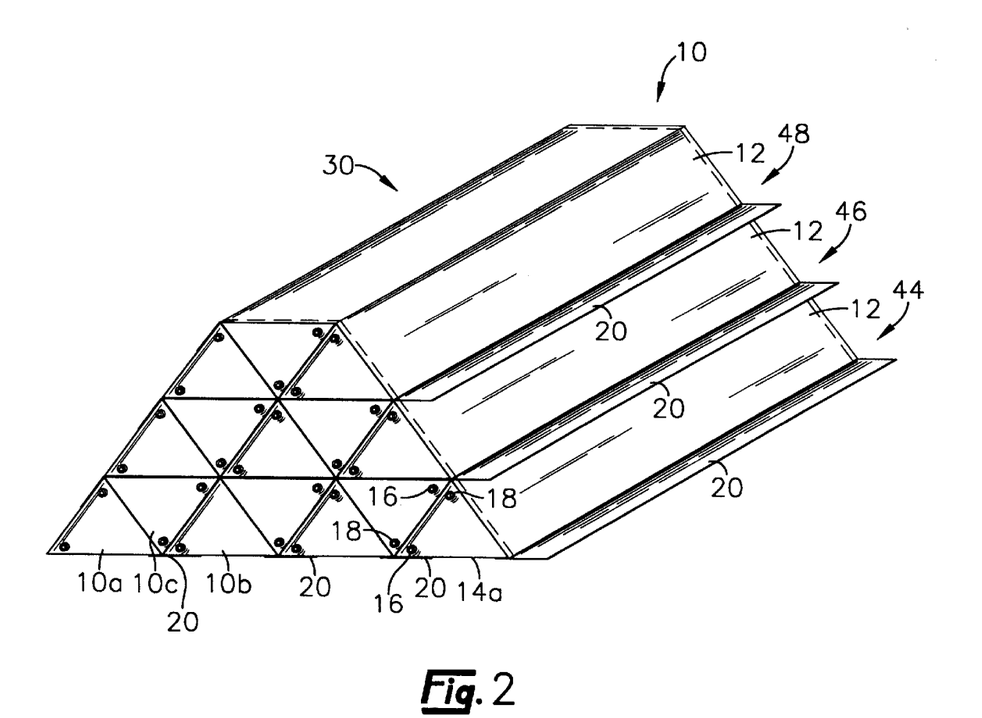
FIG. 2 is a perspective view of a levee in accordance with the present invention.

Referring now to FIG. 2, a levee 30 for impeding the flow of water is shown and which comprises a plurality of water containment devices 10, each having the design and functions stated above. The levee 30 includes a first level 44 including apparatuses 10a–10c, a second level 46, and a third level 48. As shown in FIG. 2, each level includes at least one water containment device 10 as previously described. The flaps of each device 10 are positioned to be impinged upon by one or more other devices and thereby inhibit movement of the devices 10. For example, the flap 20 of device 10a is impinged upon by devices 10b and 10c.

Figure 3:
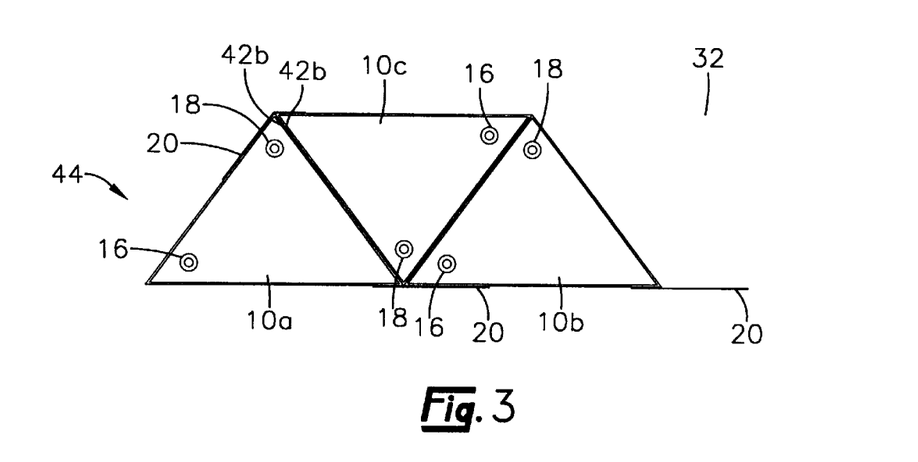
FIG. 3 is a front view of a levee in accordance with the present invention.

The first level 44, as shown in FIGS. 2 and 3, includes a body portion 12 of the second water containment device 10b has a first end 14a, a second end 14b, a base 42c, a first side 42a and a second side 42b attached to the base 42c, and a flap 20 attached to the body portion 12 and extending outwardly therefrom. The flap 20 is for receiving another water containment device 10 thereon and impeding movement of the second water containment device 10b. The first level 44 further includes a third water containment device 10c disposed between the first and second water containment devices 10a and 10b such that a first side of the third water containment device 10c is abutting the first side 42a of the second water containment device 10b. Moreover, a second side of the third water containment device 10c is abutting the second side 42b of the first water containment device 10a such that the base 42c of the second water containment device 10b is at least partially disposed on the flap 20 of the first water containment device 10a. When this occurs, and the second water containment device 10b is filled with the water via fill valve 16, the first water containment device 10a will be secured in place via weight of the second water containment device 10b being applied to the flap 20. Also, in construction of the first level 44 of the present invention, the flap 20 of the third water containment device 10c overlays at least part of the first side 42a of the first water containment device 10a.

It is also understood that the thickness or width of the levee 30 can be increased by stacking at least one row of two apparatuses configured as apparatuses 10a and 10c in FIG. 2.

As shown in FIG. 3, if the flow of water 32 rises above the first level 44, or to a level greater than the entire levee 30, the flow of water 32 will be diverted away from flowing between the second side 42b of the third water containment device 10c and the second side 42b of the first water containment device 10a thereby keeping the levee 30 in tact. The levee 30 further includes a second level 46 that includes a fourth water containment device 10 having a body portion 12 with a first end 14a, a second end 14b, a base 42c and a first side 42a and a second side 42b attached to the base 42c. The base of the fourth water containment device is adjacent the base 42c of the third water containment device 10c. Although a levee 30 having three levels 44–48 is shown in FIG. 2, it will be understood that a levee having any number of levels may be constructed with devices 10 in accordance with the invention, including levees having only a single level.

As shown in FIGS. 4 and 5, dual fill and purge position points 34 and 36 are provided along the levee 30 so that an operator can simultaneously fill and bleed two of the water containment devices 10 from a singular position and from any level of the levee 30. To accomplish this task, the water containment devices 10 must be axially aligned such that the first ends of two water containment devices are placed adjacent to each other so that the fill and bleed valves 18 and 16 can be accessed simultaneously for the two water containment devices. In operation, a hose is attached to the fill valve 16 at one end and attached to a pump at a second end, Preferably, the pump transfers water from water resting against the device 10 because it is the most readily available source of water in a flood. As previously described, all of the water containment devices 10 used in the levee 30 are preferably constructed of a non-porous, liquid repelling material (preferably PVC). Also, any two water containment devices 10 contained in any level of the levee 30 can be filled simultaneously if the water containment devices are placed such that the first end of each water containment device are adjacent.

Figure 6:
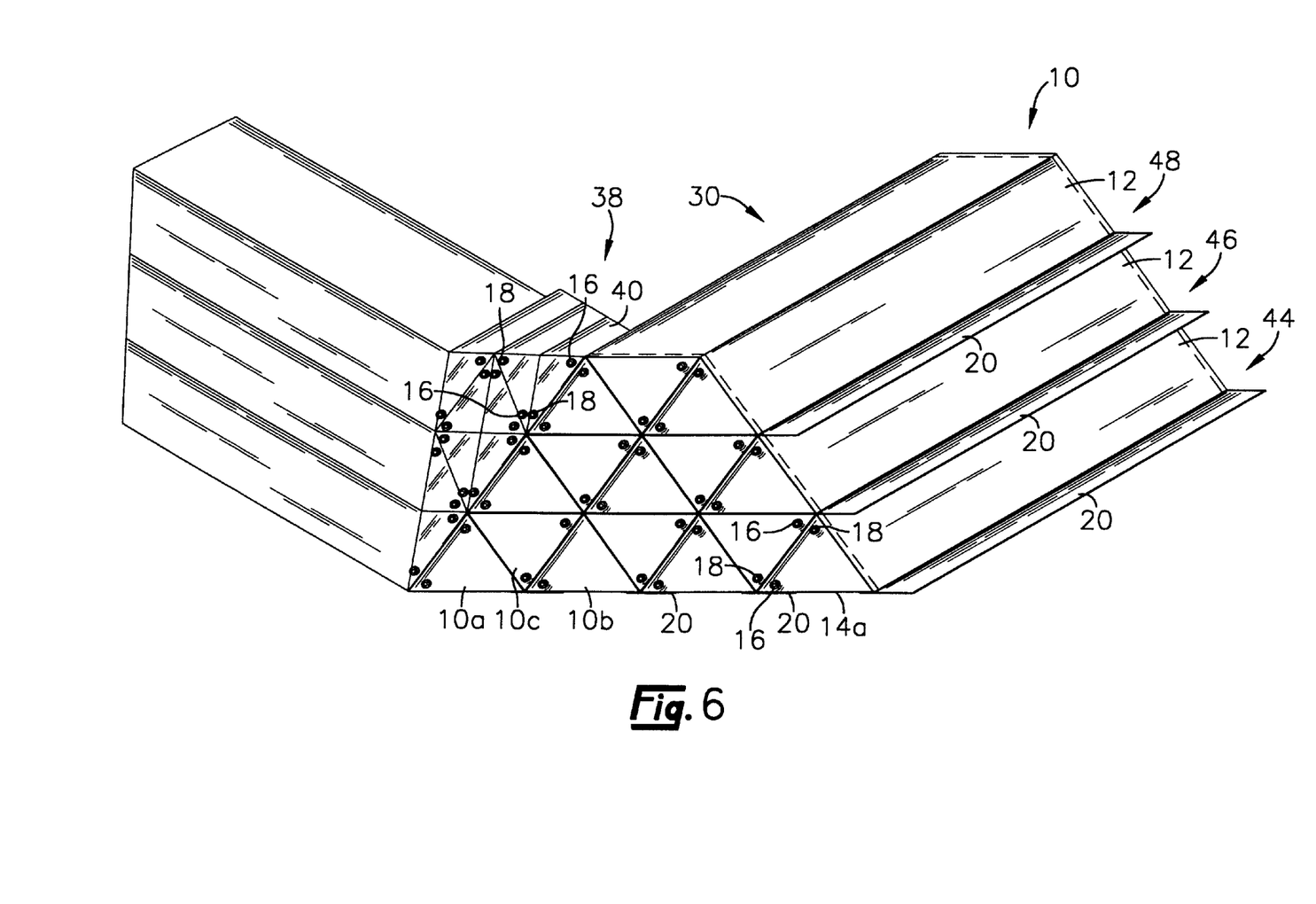
FIG. 6 is a perspective view of a levee in accordance with the present invention formed in a ninety degree angle.

Referring now to FIG. 6, a further embodiment of the present invention is shown whereby a 90° corner is formed in the levee 30. To form the corner, two levees of equal height each having a plurality of water containment devices 10, preferably having first and second sides 42a and 42b extending at 60° angles from the base 42c, are placed perpendicular. A gap will be created between the two perpendicular levees such that the gap is equal in height to the upper most level of the two levees and has two sides, one extending at a 90° angle and the other at a 60° angle. To fill the gap, a plurality of wedge shaped devices 38 are provided, each having an elongated triangular shaped body portion 40 with one angle being at a 90° or right angle. Similar to the water containment devices 10 making up the perpendicular levees, the wedge shaped water containment devices 38, which fill the gap therebetween, have fill and bleed valves 18 and 16 for filling the wedge shaped devices 38 with a water while bleeding air from the body portion 40.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A water containment device for impeding a flow of water, the water containment device comprising:
    a body portion having:
        a first end;
        a second end in opposed relation to the first end;
        a first side attached to the first and second ends;
        a first planar structural support member having a width substantially equal to the width of the first side attached to an interior surface of the first side for maintaining the form of the first side;
        a second side attached to the first and second ends and the first side;
        a second planar structural support member having a width substantially equal to the width of the second side attached to an interior surface of the second side for maintaining the form of the second side;
        a base attached to said first and second ends and said first and second sides;
        the first and second ends and the first, second, and the base defining the body portion;
    at least one valve disposed in the first end for introducing a water into an interior chamber of the body portion; and
    a flap secured to the body portion and extending outward therefrom, the flap for receiving another water containment device thereon and impeding movement of the body portion.

2. The water containment device of claim 1 wherein the body portion is collapsible for storage via the base deforming into the interior chamber of the body portion.

3. The water containment device of claim 1 wherein the body portion is elongated and triangular shaped.

4. The water containment device of claim 1 wherein each of the first and second sides project at an angle of about sixty degrees from the base.

5. The water containment device of claim 1 wherein the at least one valve is a fill valve that protrudes outward from the first end.

6. The water containment device of claim 5 further comprising a bleed valve disposed in the first end and protruding outward therefrom, the bleed valve for releasing air contained within the body portion while the water is being introduced into the body portion.

7. The water containment device of claim 6 further comprising a first flange disposed around and attached to the first end, the first flange protruding outward from the first end a distance greater than the fill and bleed valves.

8. The water containment device of claim 7 further comprising a second flange disposed around and attached to the second end.

9. The water containment device of claim 1 further comprising means for simultaneously with the water, the water containment device and another water containment device, being in axial alignment, at a singular position point.

10. The water containment device of claim 1 wherein the body portion, the at least one valve, and the flap are formed from a non-porous, liquid repelling material.

11. The water containment device of claim 10 wherein the non-porous, liquid repelling material is comprised of PVC.

12. A water containment device for impeding a flow of water, the water containment device comprising:

an elongated, body portion having a triangular cross-sectional area, said body portion including: a first end and a second end, the body portion being collapsible for storage via the base deforming into an interior chamber of the body portion between the first and second sides, and having a base, and first and second sides attached to the base and each projecting at sixty degree angles from the base;

a first structural support member attached to the first side on the interior chamber of the body portion;

a second structural support member attached to the second side on the interior chamber of the body portion;

a fill valve disposed in the first end and protruding outward therefrom, the fill valve for introducing a water into the body portion;

a bleed valve disposed in the first end and protruding outward therefrom, the bleed valve for releasing air contained within the body portion while the water is being introduced into the body portion;

a first flange disposed around and attached to the first end, the first flange protruding outward from the first end a distance greater than the fill and bleed valves;

a second flange disposed around and attached to the second end;

a flap integrally formed with the body portion and extending outward therefrom, the flap for receiving another water containment device thereon and impeding movement of the body portion; and the first and second sides for abutting against an opposing side of another water containment device thereby forming at least a partial first level of a water levee.

13. The water containment device of claim 12 wherein the body portion, first and second structural support members, fill and bleed valves, first and second flanges, and the flap are formed from a non-porous, liquid repelling material.

14. The water containment device of claim 13 wherein the non-porous, liquid repelling material is comprised of PVC.

15. A levee for impeding a flow of water, the levee comprising at least:

a first level having:
  a first water containment device including a body portion having a first end, a second end, a base, a first side and a second side attached to the base, a structural support member attached to an interior surface of the first side for maintaining the form of the first side and a planar structural support member having a width substantially equal to the width of the second side attached to an interior surface of the second side for maintaining the form of the second side, and a flap attached to the body portion and extending outward therefrom, the flap for receiving another water containment device thereon and impeding movement of the body portion;
  a second water containment device including a body portion having a first end, a second end, a base, a first side and a second side attached to the base, a planar structural support member having a width substantially equal to the width of the first side attached to an interior surface of the first side for maintaining the form of the first side and a planar structural support member having a width substantially equal to the width of the second side attached to an interior surface of the second side for maintaining the form of the second side, and a flap attached to the body portion and extending outward therefrom, the flap for receiving another water containment device thereon and impeding movement of the body portion of the second water containment device; and
  a third water containment device disposed between the first and second water containment devices such that a first side of the third water containment device is abutting the first side of the second water containment device, a second side of the third water containment device is abutting the second side of the first water containment device, such that the base of the second water containment device is at least partially disposed on the flap of the first water containment device, and the flap of the third water containment device is overlaying at least part of the first side of the first water containment device; and a second level having:
  a fourth water containment device including a body portion having a first end, a second end, a base, and a first side and a second side attached to the base; a planar structural support member having a width substantially equal to the width of the first side attached to an interior surface of the first side for maintaining the form of the first side, and a planar structural support member having a width substantially equal to the width of the second side attached to an interior surface of the second side for maintaining the form of the second side, the base of the fourth water containment device being disposed on the base of the third water containment device.

16. The levee of claim 15 wherein at least one valve is disposed in the first end of the first, second, third, and fourth water containment devices, the at least one valve for introducing a water into the body portion of the first, second, third, and fourth water containment devices.

17. The levee of claim 15 wherein the flap of the third water containment device, overlaying at least part of the first side of the first water containment device, is for diverting the flow of water, if the water rises to a level greater than the levee, such that the water is diverted away from flowing between the first side of the third water containment device and the second side of the first water containment device.

18. The levee of claim 15 wherein the body portion of the first, second, third, and fourth water containment devices is collapsible for storage via the base of the first, second, third, and fourth water containment devices deforming into an interior chamber of the body portion between the first and second sides of the first, second, third, and fourth water containment devices.

19. The levee of claim 15 further comprising a fill valve and a bleed valve disposed in the first end of the first, second, third, and fourth water containment devices and protruding outward therefrom, the bleed valve for releasing air contained within the body portion while the water is being introduced into the body portion via the fill valve.

20. The levee of claim 19 further comprising a first flange disposed around and attached to the first end of the first, second, third, and fourth water containment devices, the first flange protruding outward from the first end a distance greater than the fill and bleed valves.

21. The levee of claim 20 further comprising a fifth water containment device having a first end, a fill and bleed valve disposed in the first end, and a first flange, the fifth water containment device in axial alignment with the first water containment device such that the first flange of the first water containment device abuts the first flange of the fifth water containment device such that the body portions of the first and fifth water containment devices can be filled with the water from a singular position point.

22. The levee of claim 20 wherein the body portion, the fill and bleed valves, and the flap of the first, second, third, and fourth water containment devices are formed from a non-porous, liquid repelling material.

23. The levee of claim 22 wherein the non-porous, liquid repelling material is comprised of PVC.

24. A water containment device for impeding a flow of water, the water containment device comprising:
    a body portion having:
        a first end;
        a second end in opposed relation to the first end;
        a first side attached to the first and second ends;
        a second side attached to the first and second ends and the first side; and
        a third side attached to said first and second ends and said first and second sides;
        the first and second ends and the first, second, and third sides defining the body portion;
    at least one valve disposed in the first end for introducing a water into an interior chamber of the body portion;
    a flap secured to the body portion and extending outward therefrom, the flap for receiving another water containment device thereon and impeding movement of the body portion;
    a bleed valve disposed in the first end and protruding outward therefrom, the bleed valve for releasing air contained within the body portion while the water is being introduced into the body portion; and
    a first flange disposed around and attached to the first end, the first flange protruding outward from the first end a distance greater than the fill and bleed valves.

25. A water containment device for impeding a flow of water, the water containment device comprising:
    a body portion having:
        a first end;
        a second end in opposed relation to the first end;
        a first side attached to the first and second ends;
        a second side attached to the first and second ends and the first side; and
        a third side attached to said first and second ends and said first and second sides;
        the first and second ends and the first, second, and third sides defining the body portion;
    at least one valve disposed in the first end for introducing a water into an interior chamber of the body portion;
    a flap secured to the body portion and extending outward therefrom, the flap for receiving another water containment device thereon and impeding movement of the body portion;
    a bleed valve disposed in the first end and protruding outward therefrom, the bleed valve for releasing air contained within the body portion while the water is being introduced into the body portion;
    a first flange disposed around and attached to the first end, the first flange protruding outward from the first end a distance greater than the fill and bleed valves; and
    a second flange disposed around and attached to the second end.

26. A water containment device for impeding a flow of water, the water containment device comprising an elongate fluid impermeable bladder and means for introducing fluid into the bladder, the bladder having a generally triangular cross-section and including a generally rectangular base portion, a pair of generally rectangular sidewall portions and a pair of generally triangular end portions, wherein the rectangular sidewalls each include at least one planar structural support member having a width substantially equal to the width of the sidewall attached to an interior portion thereof for maintaining the generally rectangular form thereof.

27. The device of claim 26, wherein the means for introducing fluid into the bladder comprises a valve located on one of the end portions.

28. The device of claim 26, wherein the bladder is collapsible for storage, with the base portion being deformable and positionable between the sidewall portions.

29. A corner water barrier system, comprising:
    a plurality of first water containment devices stacked in generally longitudinal alignment to define a first stack and a plurality of second water containment devices stacked in generally longitudinal alignment to define a second stack, with the first stack positioned adjacent to and perpendicular to the second stack with a gap defined therebetween, each of the first and second water containment devices comprising an elongate fluid impermeable bladder and means for introducing fluid into the bladder, the bladder having a generally triangular cross-section and including a generally rectangular base portion, a pair of generally rectangular sidewall portions and a pair of generally triangular end portions, wherein the rectangular sidewalls each include at least one structural support member attached to an interior portion thereof for maintaining the generally rectangular form thereof; and
    a plurality of wedge shaped water containment devices arranged to fill the gap between the first and second stacks, each wedge shaped water containment device comprising a fluid impermeable bladder and a valve for introducing fluid into the bladder.

* * * * *

UNITED STATES PATENT AND TRADEMARK OFFICE
CERTIFICATE OF CORRECTION

Patent No   :   5,971,661

Dated       :   October 26, 1999

Inventor(s) :   Johnson et al.

It is certified that error appears in the above-identified patent and that said Letters Patent is hereby corrected as shown below:

Column 10, line 43: Change "comer" to --corner--.

Signed and Sealed this

Sixteenth Day of May, 2000

Attest:

Q. TODD DICKINSON

*Attesting Officer*                    *Director of Patents and Trademarks*